United States Patent [19]
Palmer

[11] Patent Number: 5,604,630
[45] Date of Patent: Feb. 18, 1997

[54] NIGHT VISION MONOCULAR WITH BALANCED OPTICS

[75] Inventor: Gary L. Palmer, Vinton, Va.

[73] Assignee: ITT Corporation, New York, N.Y.

[21] Appl. No.: 497,200

[22] Filed: Jun. 30, 1995

[51] Int. Cl.⁶ .......................... G02B 23/00; G02B 13/14; G02B 9/04
[52] U.S. Cl. .......................... 359/409; 359/355; 359/399; 359/641; 359/793
[58] Field of Search .................... 359/350, 353, 359/399–420, 663, 793, 641; 250/214 VT

[56] References Cited

U.S. PATENT DOCUMENTS

| | | | |
|---|---|---|---|
| 4,037,921 | 7/1977 | Cox | 359/407 |
| 4,929,066 | 5/1990 | Wakimoto et al. | 359/663 |
| 5,084,780 | 1/1992 | Phillips | 359/400 |
| 5,305,142 | 4/1994 | Phillips et al. | 250/214 VT |

*Primary Examiner*—Thong Nguyen
*Attorney, Agent, or Firm*—Plevy & Associates; Patrick M. Hogan

[57] ABSTRACT

A night vision device that uses low cost optics in a balanced arrangement that corrects for distortions created by the low cost optics. The night vision device is a monocular assembly that uses a Gen II or a Gen III image intensifier tube. An objective lens assembly, containing a plurality of low cost lenses, is positioned in front of the image intensifier tube so that the objective lens assembly directs low intensity light onto the input surface of the image intensifier tube. A collimator assembly is positioned proximate the output surface of the image intensifier tube, wherein the collimator assembly collimates the visible image produced by the image intensifier tube. The collimator assembly is comprised of lenses that are identical in shape, size and material to the lenses found within the objective lens assembly. However, the lenses in the collimator assembly are arranged in reverse, as a mirror image of the lenses in the objective lens assembly. As a consequence, the lenses in the collimator assembly optically balance the lenses in the objective lens assembly correcting for any distortion, magnification or reduction created by the lenses in the objective lens assembly. This enables lower cost lenses to be used in the objective lens assembly, thereby reducing the cost of the entire night vision device. Furthermore, by using the same lenses on both sides of the image intensifier tube, the number of different optical parts is reduced as is the cost of manufacture.

20 Claims, 3 Drawing Sheets

NIGHT VISION MONOCULAR WITH BALANCED OPTICS

FIELD OF THE INVENTION

The present invention relates to optical devices that enable a viewer to observe objects at night or during other low-light conditions. More specifically, the present invention relates to a hand-held night vision monocular with a simplified optical layout that enables the monocular to be manufactured at low cost.

BACKGROUND OF THE INVENTION

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications such as part of the sights of various weapons or as part of goggle assemblies that attach to an aviator's or soldier's helmet. As a consequence, many of the night vision devices currently being manufactured are neither affordable nor easily adapted to non-military uses by the general public.

Night vision devices typically include an image intensifier tube that converts low intensity and/or infrared energy into visible light. Such night vision devices typically require sophisticated power supplies and circuitry to control the operation of the image intensifier tube and sophisticated optical arrangements that direct the infrared energy into the image intensifier tube and visible light away from the image intensifier tube. In military applications, the various military personnel are trained in how to use and adjust the night vision devices they are issued. However, a night vision device designed for use by the general public must have simple adjustments that can be readily operated by a variety of different users in a dark environment. Preferably, a night vision device designed for the general public would have little or no adjustments so that a person need only turn on the device and look through it to obtain night vision.

As military sales wain, more and more night vision devices are being marketed directly to the general public. However, few of such prior art night vision devices are designed to be both low cost and easy to operate. ITT Corporation, the assignee herein, manufactures a variety of night vision devices for the military and the general public. Examples of some of the handheld monocular devices that are being sold to the public are shown in U.S. patent application Ser. No. 08/108,989 entitled NIGHT VISION BINOCULARS, filed Aug. 18, 1993, now U.S. Pat. No. 5,495,364, and U.S. patent application Ser. No. 08/405,172 entitled COMPACT NIGHT VISION DEVICE, filed Mar. 16, 1995. Such prior art monocular devices are far easier to use and are much less expensive than are their military counterparts. However, even these night vision devices have adjustable objective lens assemblies and folded optics that add significantly to the overall cost of the night vision device.

It is therefore an object of the present invention to provide a night vision monocular device with a simplified optical arrangement, thereby making the night vision monocular both easier to use and less expensive to manufacture.

It is a further object of the present invention to provide a housing for a night vision monocular device that is low cost and easily assembled with the simplified optical arrangements contained within the night vision monocular device.

SUMMARY OF THE INVENTION

The present invention is a night vision device that uses low cost optics in a balanced arrangement that is self-correcting for any distortions created by the low cost optics. The night vision device is preferably a monocular assembly that uses a Gen II or a Gen III image intensifier tube. An objective lens assembly, containing a plurality of low cost lenses, is positioned in front of the image intensifier tube so that the objective lens assembly directs low intensity light onto the input surface of the image intensifier tube. A collimator assembly is positioned proximate the output surface of the image intensifier tube, wherein the collimator assembly collimates the visible image produced by the image intensifier tube. The collimator assembly is comprised of lenses that are identical in shape, size, and material to the lenses found within the objective lens assembly. However, the lenses in the collimator assembly are arranged in reverse, as a mirror image of the lenses in the objective lens assembly. As a consequence, the lenses in the collimator assembly optically balance the lenses in the objective lens assembly correcting for any distortion, magnification, or reduction created by the lenses in the objective lens assembly. This enables lower cost lenses to be used in the objective lens assembly, thereby reducing the cost of the entire night vision device. Furthermore, by using the same lenses on both sides of the image intensifier tube, the number of different optical parts is reduced as is the cost of manufacture.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the optical design of the present invention night vision device can be used in many different applications where an image intensifier tube is used to provide night vision capabilities, such as in night vision goggles, large weapons such as artillery and tanks, and the like, the present invention is especially well suited for use as a hand-held night vision monocular. Accordingly, the present invention will be described as a night vision monocular assembly in order to set forth the best mode of the invention.

Figure 1:
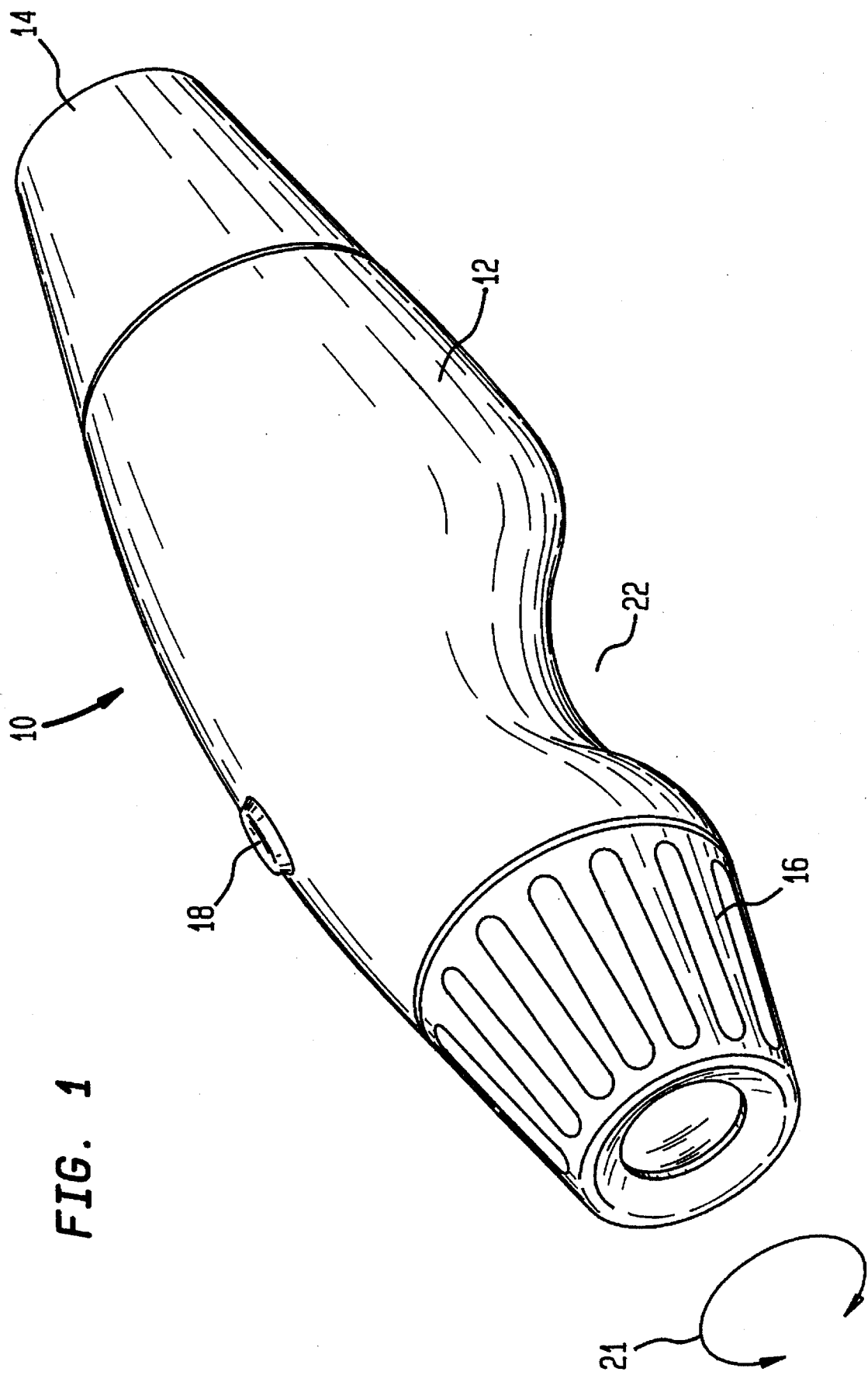
FIG. 1 is a perspective view of one preferred embodiment of the present invention night vision monocular.

Referring to FIG. 1 there is shown a night vision monocular assembly 10. The optics of the monocular assembly 10 are contained within a housing 12. As will later be explained, a first large elastomeric end cap 14 is disposed proximate the forward end of the housing 12. Similarly, a second elastomeric end cap 16 is disposed proximate the ocular end of the housing 12. The two elastomeric end caps 14, 16 protect the optics of the monocular assembly 10, should the monocular assembly 10 be dropped. Furthermore, the two elastomeric caps 14, 16 are shaped to match the curvature of the housing 12, thereby providing the monocular assembly with its unique torpedo shape. The night vision monocular assembly 10 has only a single electrical control and a single optional optical control. The single electrical control is an on/off switch 18 located on the top of the housing. As will later be explained, the single optional optical control is an ocular lens adjustment operated by rotating the second elastomeric end cap 16 in the directions of arrow 21. By providing a night vision device with an on/off switch and one or no optical adjustments, a night vision device is provided that can be easily used by most any person, wherein the person using the night vision monocular 10 need only to turn the monocular on and look through its optics.

A large relief 22 is provided within the shape of the housing 12. The relief 22 is shaped to accommodate the space on a person's hand in between the thumb and the forefinger. As such, the housing 12 is ergonomically configured to be held by one hand. As a person grips the housing 12 and places his/her thumb and forefinger around the relief 22, the forefinger of the hand passes over the on/off switch 18. As a result, a person can grip the housing 12 and operate the device without having to change the position of the hand on the housing. This prevents users from having to search for different controls in the dark environment in which the night vision device is typically used.

Figure 2:
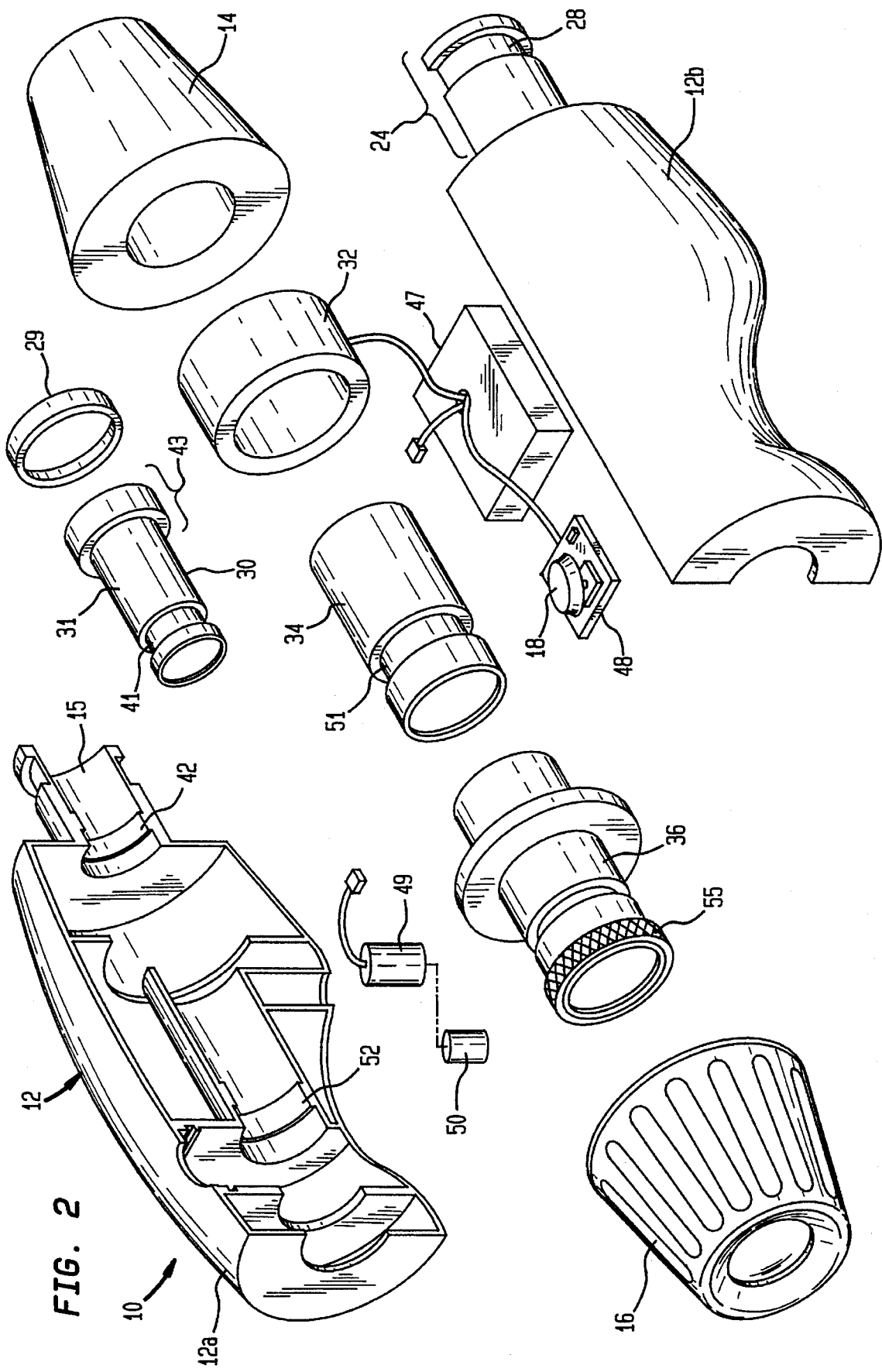
FIG. 2 is an exploded perspective view of the embodiment of FIG. 1, used to illustrate preferred embodiments of internal components.

Referring to FIG. 2, it can be seen that the housing 12 of the night vision monocular 10 is preferably made from two housing halves 12a, 12b. The two halves 12a, 12b are joined by adhesive and/or mechanical means, such as screws. The housing 12 has an elongated neck portion 24 that extends into the forward elastomeric end cap 14. A groove 28 circumvents the exterior of the neck portion 24. A plastic collar element 29 passes over the neck portion 24 and passes into the groove 28, thereby mechanically binding and aligning the two halves of the housing 12. The forward elastomeric end cap 14 also passes over neck portion 24 of the housing 12, wherein the forward elastomeric end cap 14 is retained in place by either an interference fit and/or adhesive. The forward elastomeric end cap 14 provides padding to the neck portion 24, thereby protecting the neck portion 24 and the optics it retains from damage should the night vision monocular 10 ever be dropped.

Within the night vision monocular are contained an objective lens assembly 30, an image intensifier tube 32, a collimator assembly 34, and an eyepiece assembly 36. In the shown embodiment, the objective lens assembly 30 is not adjustable. As will later be explained, the objective lens assembly 30 is focused at an infinite conjugate, thereby providing essentially collimated light to the image intensifier tube 32. The objective lens assembly 30 is rigidly retained in a set position within the housing 12. A groove 41 is disposed within the casing 31 of the objective lens assembly 30. An annular protrusion 42 extends inwardly from the interior surface of the housing 12, wherein the annular protrusion 42 engages the groove 41 and retains the objective lens assembly 30 in place. The objective lens assembly 30 also includes an enlarged head region 43 that is not retained within the housing 12. Rather, the head region 43 abuts against the forward edge 15 of the housing 12, thereby further helping to retain the objective lens assembly 30 in a fixed orientation with respect to the housing 12.

The housing 12 is also shaped to retain the image intensifier tube 32 in optical alignment with the objective lens assembly 30. The image intensifier tube 32 is preferably a GEN II tube, however a GEN III tube can be used if the GEN III tube does not contain a fiber optic inverter. The image intensifier tube 32 is coupled to a power supply 47 that provides power to the tube. The image intensifier tube 32 is also coupled to a small circuit board 48 that contains the on/off switch 18 thereon, wherein the on/off switch 18 controls the flow of electricity between the power supply 47 and the image intensifier tube 32. The power supply 47 is coupled to a battery port 49 at the bottom of the housing 12 wherein the battery port 49 is adapted to receive a battery 50.

The collimator assembly 34 collimates the image produced by the image intensifier tube 32. The housing 12 is shaped to retain the collimator assembly 34 in a set position relative to the image intensifier tube 32. As with the objective lens assembly 30, the collimator assembly 34 may contain a grove 51 on its exterior surface that is engaged by an annular protrusion 52 that extends inwardly from an inner surface of the housing 12. As will be later explained, the lenses contained within the collimator assembly 34 are the mirror image of the lenses contained within the objective lens assembly 30. As a result, any distortions created by the use of inexpensive lenses within the objective lens assembly 30 can be corrected by the reverse use of those same inexpensive lenses in the collimator assembly 34.

The collimator assembly 34 collimates the image produced by the image intensifier tube 32 and directs that light into the eyepiece assembly 36. As will be explained, the eyepiece assembly 36 contains lens that inverts the collimated image for viewing. The eyepiece assembly 36 may be a static optical arrangement designed to produce a focused image to a person with perfect vision. However, in a preferred embodiment, the eyepiece assembly 36 is an adjustable optical arrangement that enables a user to vary the focus of the viewed image to compensate for the particular vision requirements of the user. The prior art is replete with optical devices that have eyepiece assemblies that can be focused. Many of these eyepiece assemblies have a focus knob, wherein positions of a lens within the eyepiece assembly varies with the turning of the focus knob. Any such eyepiece assembly can be used in connection with the present invention. However, in the present invention night vision monocular 10, the elastomeric end cap 16 acts as a medium for manipulating the focus knob. As such, by mining the elastomeric end cap 16, the eyepiece assembly 36 can be selectively focused. In the shown embodiment, the elastomeric end cap 16 engages a focus knob 55 on the exterior of the eyepiece assembly 36 with either an interference fit and/or an adhesive bond. As the elastomeric end cap 16 is turned, the focus knob 55 turns and the eyepiece assembly 36 is brought into focus.

Figure 3:
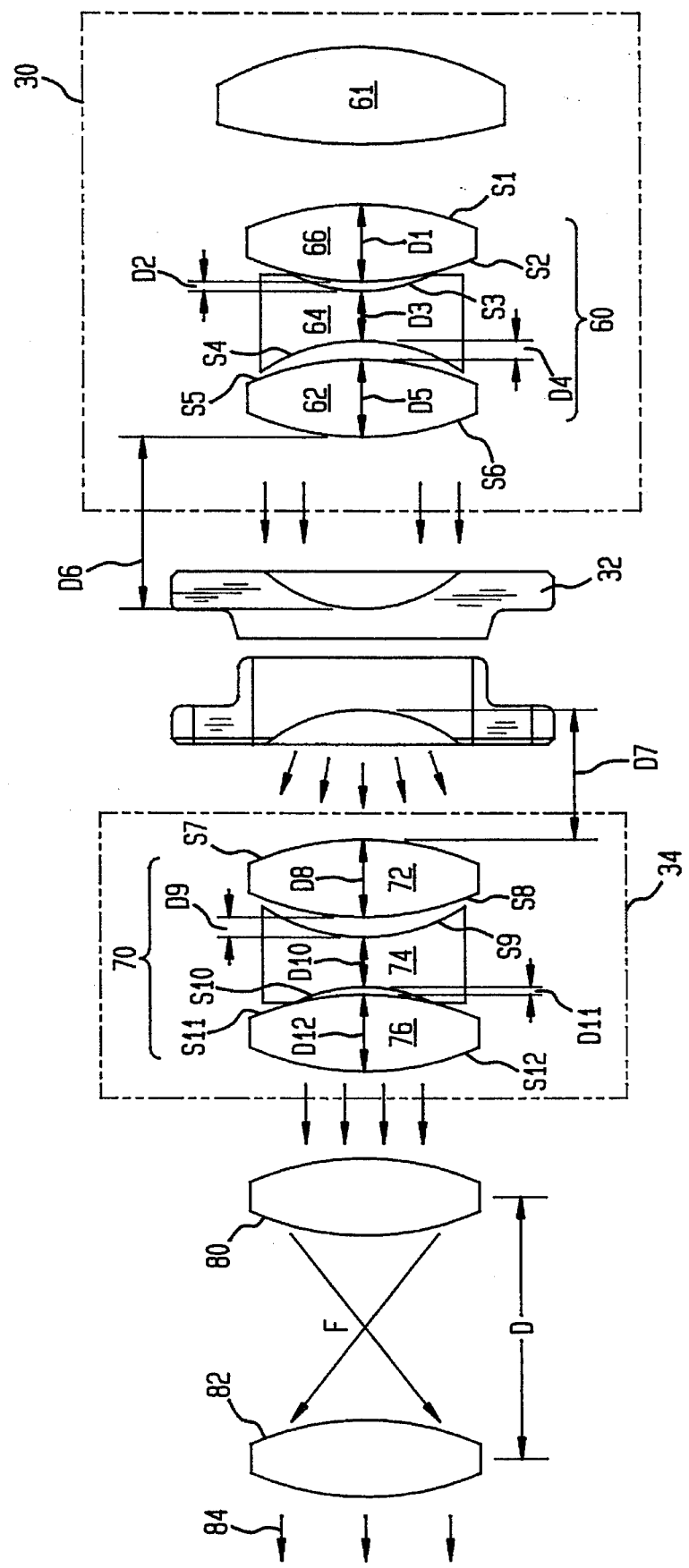
FIG. 3 is an optical schematic that illustrates the position, shapes and sizes of the preferred embodiment of optical elements contained within the night vision monocular.

Referring to FIG. 3, it can be seen that the objective lens assembly 30 contains a collimating arrangement 60 of three lens 62, 64, 66 and an optional objective lens 61 to provide a predetermined degree of magnification or a wider field of view. The objective lens 61, if present, directs incoming light onto the first lens 66 in the collimating arrangement 60. The lenses in the collimating arrangement 60 are selected so that the collimating arrangement is focused at an infinite conjugate. Although many different lenses and number of lens could be used in the collimating arrangement 60, the preferred lens arrangement and types are represented by Table 1 below.

TABLE I

| LENS NUMBER IN FIG. 3 | SURFACE IN FIG. 3 | MID-LINE DISTANCE IN FIG. 3 | GLASS TYPE |
| --- | --- | --- | --- |
| LENS 66 | S1 = 16.36 mm | — | LaK-N13-694-533 |
|  | — | D1 = 6.00 mm |  |
|  | S2 = 32 mm | — |  |
| LENS 64 | — | D2 = .7 mm | SF5-673-322 |
|  | S3 = 19.29 mm | — |  |
|  | — | D3 = 4.6 mm |  |
|  | S4 = 12.24 mm | — |  |
| LENS 62 | — | D4 = 1.9 mm | LaK-N13-694-533 |
|  | S5 = 19.29 mm | — |  |
|  | — | D5 = 6.5 mm |  |
|  | S6 = 19.29 mm | — |  |
| TUBE 32 |  | D6 = 12.55 mm | — |

The lenses listed in Table 1 are not made of exotic glass and the tolerances for the various dimensions are fairly liberal compared to military night vision standards. As low intensity light passes through the collimating arrangement 60 of the objective lens assembly 30, the light impinges upon the image intensifier tube 32. The image intensifier tube 32 intensifies the light producing a visible image at on its output surface. The visible image emitted by the image intensifier tube 32 is directed through the collimator assembly 34. The collimator assembly 34 includes a collimating arrangement 70 of three lenses 72, 74, 76 that exactly mirror the collimating arrangement 60 within the objective lens assembly 30. As can be seen from Table II below, lenses 72, 74, 76 in the collimator assembly 34 are the respective mirror images of the lenses 62, 64, 66 in the objective lens assembly 30.

TABLE II

| LENS NUMBER IN FIG. 3 | SURFACE IN FIG. 3 | MID-LINE DISTANCE IN FIG. 3 | GLASS TYPE |
| --- | --- | --- | --- |
|  | — | D7 = 12.55 mm |  |
| LENS 72 | S7 = 19.92 mm | — | LaK-N13-694-533 |
|  | — | D8 = 6.5 mm |  |
|  | S8 = 19.29 mm | — |  |
| LENS 74 | — | D9 = 1.9 mm | SF5-673-322 |
|  | S9 = 12.24 mm | — |  |
|  | — | D10 = 4.6 mm |  |
|  | S10 = 19.29 mm | — |  |
| LENS 76 | — | D11 = .7 mm | LaK-N13-694-533 |
|  | S11 = 32 mm | — |  |
|  |  | D12 = 6 mm |  |
|  | S12 = 16.36 mm | — |  |

Since the lenses 72, 74, 76 in the collimator assembly 34 mirror the lenses 62, 64, 66 in the objective lens assembly 30, the overall system is self correcting for any distortions created by the lenses. For example, suppose the lenses 62, 64, 66 in the objective lens assembly 30 created a predetermined distortion in the light passing therethrough. That distortion would be propagated through the output of the image intensifier tube 32 and would then be oppositely corrected by the passage of the distorted image through the lenses 72, 74, 76 in the collimator assembly 34. Accordingly precision optics need not be used, thereby greatly reducing the cost of the overall night vision monocular 10. Another advantage of using balanced optics on either side of the image intensifier tube 32, is that the power of magnification remains at 1:1. Should the three lenses 62, 64, 66 in the collimator arrangement 60 of the objective lens assembly 30 provide any magnification or reduction that optical power would be reversed by the three lenses 72, 74, 76 in the collimator assembly 34. As a result, the only magnification or reduction of the image would be had by either the optional objective lens 61 or the lenses associated with the eyepiece.

The preferred embodiment of the present invention night vision monocular 10, utilizes a GEN III image intensifier tube or a GEN III image intensifier tube absent a fiber optic inverter. In both situations, the image intensifier tube 32 inverts the image it receives from the objective lens assembly 30. As a result, the image produced by the image intensifier tube must be reinverted prior to viewing. In the shown embodiment, two biconvex lenses 80, 82 are used to invert the collimated image emitted through the collimator assembly 34. It is well known in optics that by spacing two identical biconvex lenses apart from another by a distance at least as great as twice the focal distance of the lenses, then an image viewed through both lenses will be inverted. This principle is utilized in the shown embodiment. The two biconvex lenses 80, 82 are spaced apart by a distance D at least as great as the twice the focal distance of each lens. As such, the distance D is dependent upon the surface curvatures of the two biconvex lenses. The biconvex lenses preferably have the same radius of curvature on each of their surfaces and it should be understood that a wide range of curvatures, materials and lens thickness can be used.

The inverted collimator light from the collimator assembly 34 passes through the first biconvex lens 80. The collimated light converges at focal point F and is reinverted by the time it reaches the second biconvex lens 82. Since the second biconvex lens 82 is identical to the first biconvex lens 80, the optics are balanced and the second biconvex lens 82 recollimates the image for viewing. The first biconvex lens 80 is preferably fixed. However, the second biconvex lens 82 may be adjustable, via the eyepiece focus controls, to enable a person to adjust the viewed image at a viewing point 84 to his/her optical requirements.

It will be understood that since the objective lens assembly 30 and collimator assembly 34 contain identical lenses, the identical lenses can be held within identical casings. As such, when the night vision monocular 10 is being assembled, the two identical casings can be placed on either side of the image intensifier tube without concerned as to where each casing belongs. As a consequence, only one optical arrangement needs to be manufactured, wherein that single optical arrangement can be used in both the objective lens assembly and the collimator assembly. This reduces the number of unique optical elements in the night vision monocular, thereby making the monocular much less expensive to manufacture and assemble.

It will be understood that the night vision monocular assembly described herein is merely exemplary and that a person skilled in the art may make many variations and modifications to the described embodiments utilizing functionally equivalent optical components to those described. All such variations and modifications are intended to be included within the scope of this invention as defined by the appended claims.

What is claimed is:

1. A night vision device, comprising:

an image intensifier tube having an input surface for receiving low intensity light and an output surface for producing a visible image;

an objective lens assembly, including a first plurality of lenses adjacent said input surface of said image intensifier tube, for directing the low intensity light onto said input surface;

a collimator assembly, including a second plurality of lenses adjacent said output surface of said image intensifier tube, for collimating said visible image, wherein said second plurality of lenses are arranged as a mirror image of said first plurality of lenses.

2. The night vision device according to claim 1 wherein said image intensifier tube produces an inverted image at said output surface and said device further includes a means for reinverting said inverted image.

3. The night vision device according to claim 2, wherein said means for reinverting said inverted image includes at least two identical biconvex lenses.

4. The night vision device according to claim 3, further including a focusing mechanism for selectively varying the position of at least one of said biconvex lenses.

5. The night vision device according to claim 1 wherein said first plurality of lenses are disposed a predetermined distance from said input surface of said image intensifier tube and said second plurality of lenses are disposed said predetermined distance from the said output surface of said image intensifier tube.

6. The night vision device according to claim 1, wherein said first plurality of lenses substantially collimate the low intensity light.

7. The night vision device according to claim 6, wherein said second plurality of lenses substantially collimate the visible image.

8. The night vision device according to claim 1, wherein said first plurality of lenses, said second plurality of lenses and said image intensifier tube are coaxially aligned.

9. The night vision device according to claim 1, wherein said objective lens assembly is not adjustable and is focused at an infinite conjugate.

10. The night vision device according to claim 1, wherein said first plurality of lenses includes at least three lens elements.

11. The night vision device according to claim 1, wherein said objective lens assembly includes at least one lens element that directs the low intensity light through said first plurality of lenses.

12. The night vision device according to claim 1, wherein said first plurality of lenses includes a first biconvex lens, a second biconvex lens and a biconcave lens disposed therebetween.

13. The night vision device according to claim 1, wherein said first plurality of lenses have an optical power associated therewith and said second plurality of lenses have an equal and opposite optical power.

14. The night vision device according to claim 1, wherein said first plurality of lenses have optical distortion properties associated therewith and said second plurality of lenses have equal and opposite optical distortion properties.

15. A method of manufacturing a night vision device, comprising the steps of:

providing an image intensifier tube having an input surface and an output surface;

positioning a first plurality of lenses proximate said input surface of said image intensifier tube, wherein said first plurality of lenses direct light onto said input surface;

positioning a second plurality of lenses proximate said output surface of said image intensifier tube, wherein said second plurality of lenses correspond in number, size, and shape with said first plurality of lenses and act to collimate an image emitted form said output surface; and providing an eyepiece assembly for viewing the image emitted from said output surface.

16. The method according to claim 15, futher including the step of providing a means for inverting the image emitted from said output surface.

17. The method according to claim 16, further including the step of positioning said first plurality of lenses and said second plurality of lenses equidistantly from said image intensifier tube.

18. The method according to claim 16, wherein said step of providing a means for inverting includes positioning two biconvex lens between said second plurality of lenses and a viewing point.

19. The method according to claim 15, wherein said second plurality of lenses are disposed in an orientation that is a mirror image of said first plurality of lenses.

20. The method according to claim 15, wherein said first plurality of lenses are focused at an infinite conjugate.

* * * * *